United States Patent [19]
Dorsch

[11] 4,078,513
[45] Mar. 14, 1978

[54] TOW PLATE FOR FLOATING BOOM
[75] Inventor: Robert Eugene Dorsch, South Bend, Ind.
[73] Assignee: Uniroyal, Inc., New York, N.Y.
[21] Appl. No.: 748,573
[22] Filed: Dec. 9, 1976
[51] Int. Cl.² ............................................. B63B 21/56
[52] U.S. Cl. ........................................ 114/244; 61/1 F
[58] Field of Search ............. 9/310 R, 310 G, 310 A; 114/242, 243, 244, 245, 256, 253, 270; 61/1 F; 210/DIG. 25

[56] References Cited
U.S. PATENT DOCUMENTS

| | | | |
|---|---|---|---|
| 3,031,697 | 5/1962 | Klein | 9/310 A |
| 3,042,944 | 7/1962 | Basey et al. | 114/253 X |
| 3,182,341 | 5/1965 | Rieffle | 9/310 C |
| 3,701,259 | 10/1972 | Heartness | 61/1 F |
| 3,739,584 | 6/1973 | Belin | 61/1 F |
| 3,953,905 | 5/1976 | Paitson | 114/253 |

*Primary Examiner*—Robert B. Reeves
*Assistant Examiner*—Edward M. Wacyra
*Attorney, Agent, or Firm*—Lawrence E. Sklar

[57] ABSTRACT

A tow plate is provided which is suitable for use with a floatable oil boom. The tow plate comprises a vertically planar central plate, a pair of skis facing the front of the tow plate and attached to the top portion of the central plate, a buoyant material secured to the upper surfaces of the pair of skis whereby the tow plate is floatable in water, and a pair of planar fins attached perpendicular to the bottom portion of the central plate.

9 Claims, 6 Drawing Figures

TOW PLATE FOR FLOATING BOOM

BACKGROUND OF THE INVENTION

The instant invention relates generally to a floating boom for confining material floating on a liquid, and more particularly concerns a two plate which is attached to the leading edge of a floating boom used to confine oil floating on water.

Oil spills have created problems of increasing seriousness in many parts of the world during recent years. Since oil has a density lower than water, it will float and spread over wide areas and thereby constitutes a dangerous pollution source. In several cases, large oil tankers wrecked at sea have spilled thousands of gallons of crude oil into the ocean near beaches, harbors, and shore installations. Ruptured hoses and leaking fittings at refineries and shipping terminals have also created serious oil spills in busy harbors. This spilled floating oil is a fire hazard in addition to polluting nearby land areas. It is therefore highly desirable to restrict spilled oil as rapidly as possible to as small an area as possible in order to facilitate its recovery, minimize pollution, and reduce the potential fire hazard.

Heretofore various types of booms have been devised to confine material floating on the surface of a liquid, such as the boom disclosed in U.S. Pat. No. 3,903,701, issued Sept. 9, 1975 to Uniroyal, Inc., the assignee of the instant invention. The function of these booms is to prevent oil or similar products from spreading, thereby isolating the pollutant in an area where it can be removed from the surface. With the boom confining the oil, authorities can concentrate on cleaning it up by skimming it from the surface, applying straw to absorb the oil or spraying the oil with chemicals. Typical booms, such as the one disclosed in the aforementioned patent, are first deployed upon the water near the spill and then towed into a position so that the oil may be corralled and even surrounded.

When the boom is being towed into a corralling position, experience has shown that the leading edge of the boom often moves in an uncontrolled and erratic manner, even at very low tow speeds, diving below the surface of the water, pulling the boom under and aggravating any twist conditions which may have previously been introduced into the boom by reason of rotation of the boom in the water during towing.

The instant invention therefore provides a tow plate for attachment to the leading edge of the boom which is designed to minimize uncontrolled and erratic movement of the leading edge of the boom in the course of towing the boom.

SUMMARY OF THE INVENTION

Accordingly, the instant invention provides a tow plate suitable for use with a floatable oil boom. The plate comprises a vertically planar central plate, a pair of skis facing the front of the tow plate and attached to the top portion of the central plate, a buoyant material secured to the upper surfaces of said pair of skis whereby the tow plate is floatable in water, and a pair of planar fins attached perpendicular to the bottom portion of the central plate.

BRIEF DESCRIPTION OF THE DRAWINGS

FIG. 5 is a sectional view taken on the plane indicated by the line 5—5 in FIG. 2;

FIG. 6 is a sectional view taken on the plane indicated by the line 6—6 in FIG. 2.

DESCRIPTION OF THE PREFERRED EMBODIMENT

Figure 1:
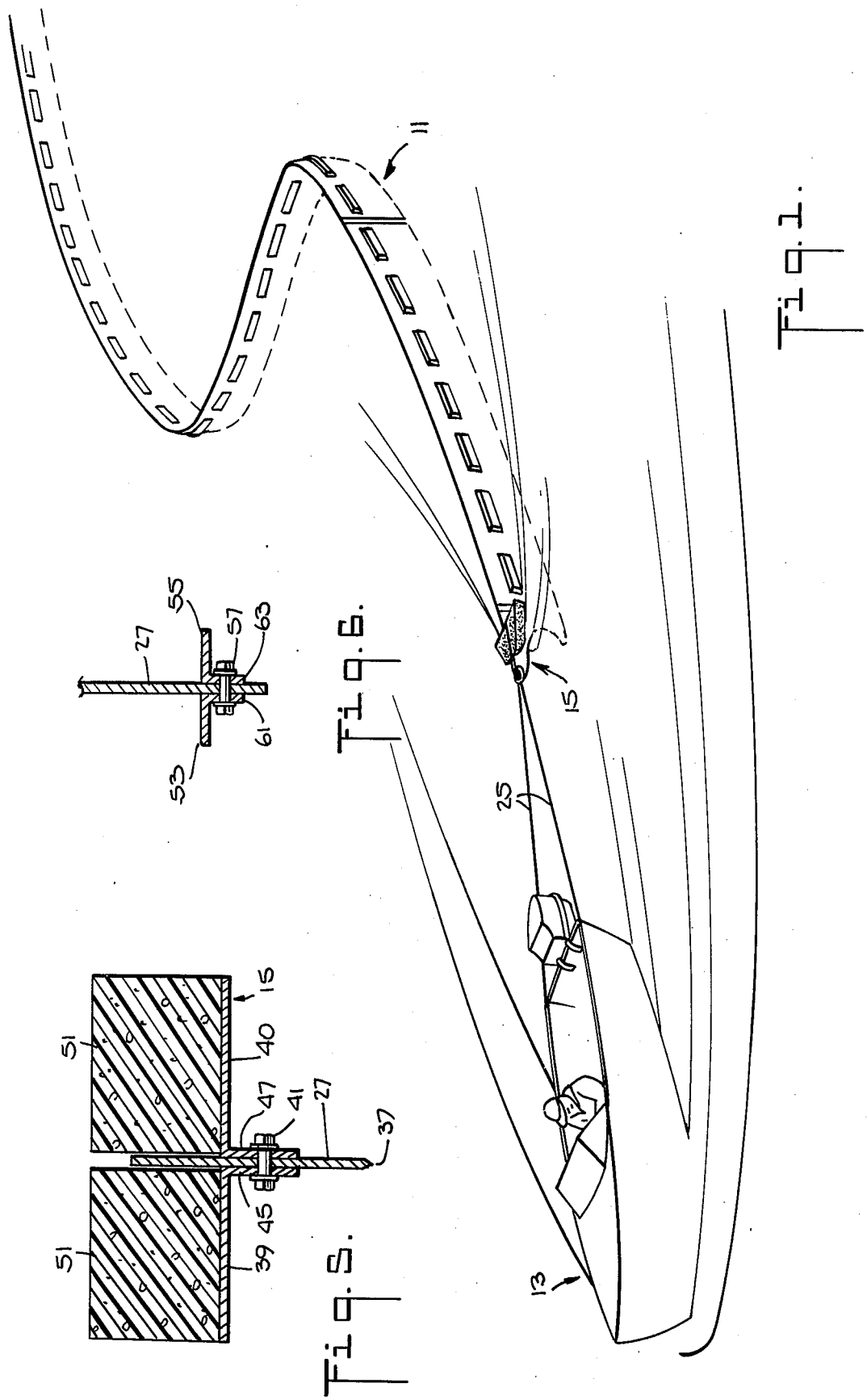
FIG. 1 is a perspective view showing a boom being towed.

In describing the preferred embodiment of the instant invention, reference is made to the drawings, wherein there is seen in FIG. 1 an oil containing boom 11 being towed by a boat 13. A tow plate generally designated 15, preferably made from aluminum, is secured to the leading edge 17 (see FIGS. 2 and 3) of the boom 11 by means of five bolts 19 which pass through five apertures 22 situated along trailing, substantially vertical edge 20 of the plate 15. The tow plate 15 includes an aperture 21 in which is housed a towing ring 23. Ropes 25 connect the towing ring 23 with the boat 13.

The tow plate 15 comprises a vertically planar central plate 27 which includes a substantially horizontal top edge 29 extending forward from the top of the plate's trailing, substantially vertical edge 20 to a substantially semi-circular nose portion 31 which includes the aforementioned ring aperture 21. Extending downward from the nose portion 31 is an arcuate, bow-like edge 33 which leads downward to a rudder-like edge 35 whose curvature is opposite that of the bow-like edge 33. Extending across from the rudder-like edge 35 to the bottom of the trailing vertical edge 20 is a substantially horizontal base edge 37.

Figure 2:
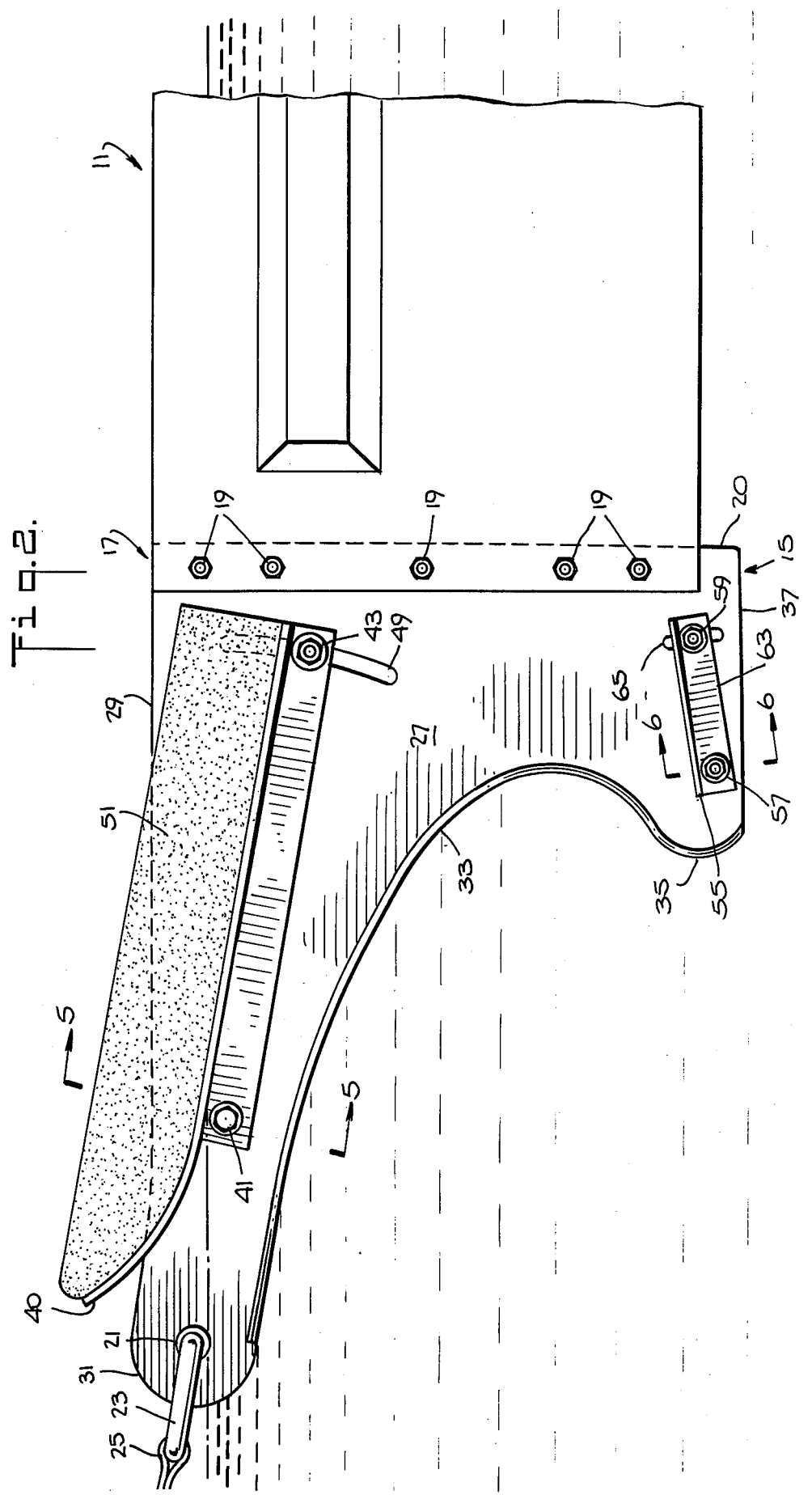
FIG. 2 is an enlarged, side elevational view of the tow plate of the instant invention secured to the leading edge of the boom.
Figure 3:
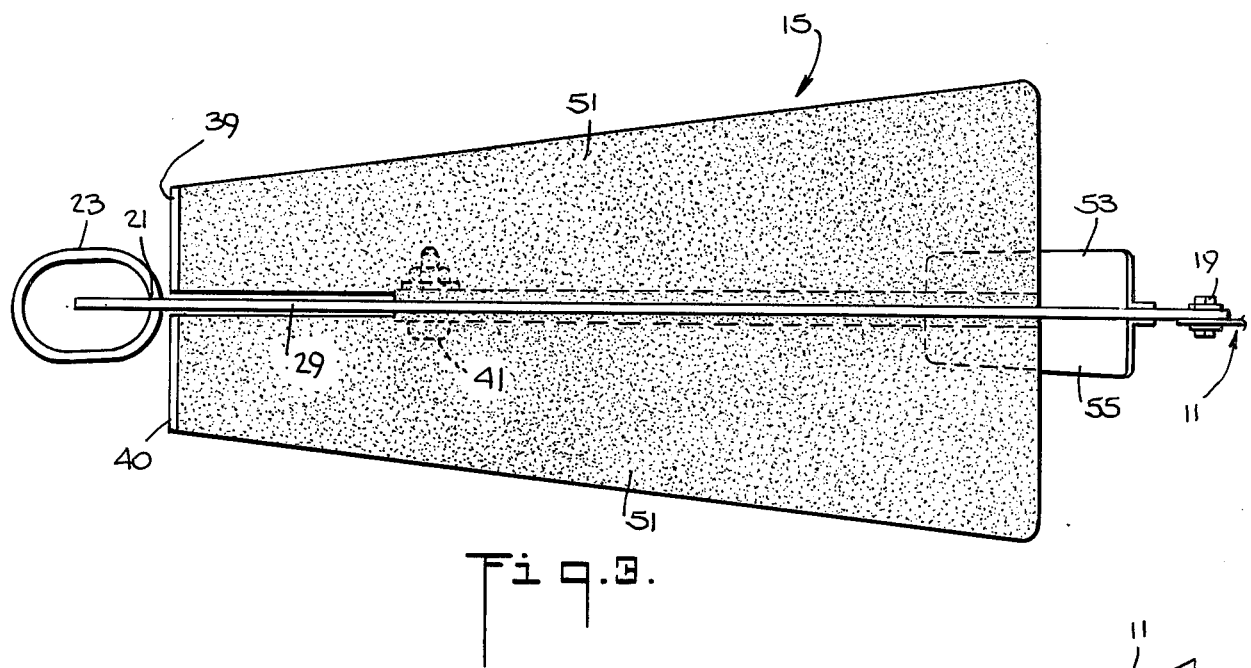
FIG. 3 is top plan view of the tow plate shown in FIG. 2.
Figure 4:
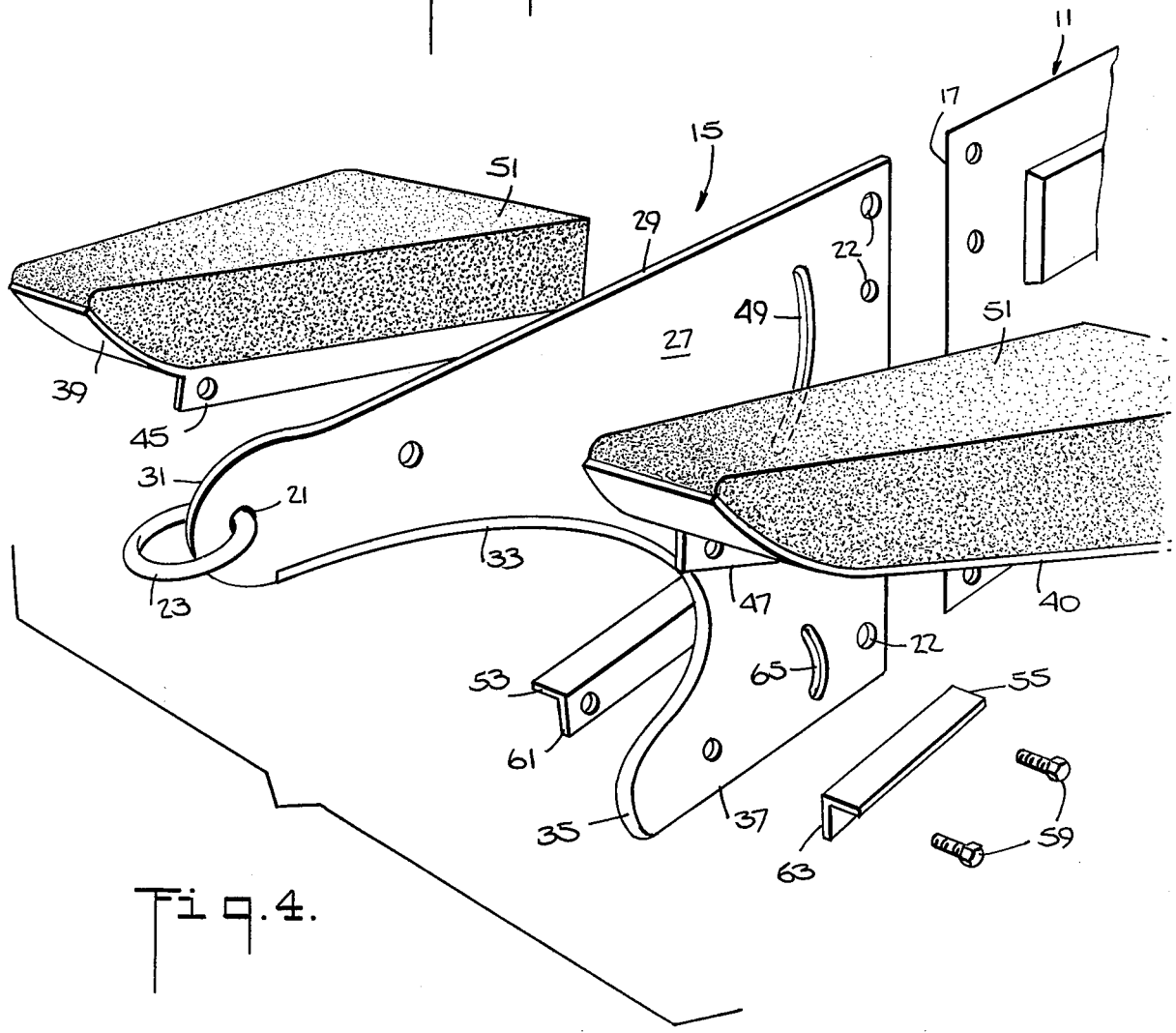
FIG. 4 is an enlarged, exploded perspective view of the tow plate shown in FIG. 2.

As best seen in FIGS. 2 and 4, a pair of skis 39 and 40 are secured to the top portion of the central plate 27 by means of bolts 41 and 43 which pass through vertical flanges 45 and 47 of the skis 39 and 40 respectively. The plate 27 includes a first arcuate channel 49 in its top portion for seating of the bolt 43, thereby providing adjustability to the slope of the skis 39 and 40 by means of pivoting action about bolt 41. The skis 39 and 40 face the front of the tow plate 15 and have secured to their upper surfaces a buoyant material 51. The buoyant material may be any material capable of keeping the tow plate 15 afloat in water, but the preferred material is a foam sold by Uniroyal, Inc. under the trademark "Ensolite", which is a closed cell foam of a nitrile rubber-polyvinylchloride blend, as disclosed in U.S. Pat. No. 2,757,147, issued July 31, 1956, and assigned to Uniroyal, Inc., the assignee of the instant invention.

A pair of planar fins 53 and 55 are secured perpendicular to the bottom portion of the central plate 27 by means of bolts 57 and 59 which pass through vertical flanges 61 and 63 of the two fins 53 and 55 respectively. The plate 27 includes a second arcuate channel 65 in its bottom portion for seating of the bolt 59, thereby providing adjustability to the slope of the fins 53 and 55 by means of pivoting action about bolt 57.

Although the tow plate 15 has been described, in its preferred embodiment, as having adjustable skis and fins, said skis and fins may also be fixedly secured to the central plate 27. Also, the width of the skis and buoyant material thereon, though preferably tapered, as shown, may be uniform.

The invention disclosed will have many modifications which will be apparent to those skilled in the art in view of the teachings of the specification. It is intended that all modifications which fall within the true spirit and scope of this invention be included within the scope of the appended claims.

What is claimed is:

1. A tow plate suitable for use with a floatable oil boom, comprising:

a vertically planar central plate, said plate including a trailing, substantially vertical edge, a substantially horizontal top edge extending forward from the top of the trailing, substantially vertical edge, a substantially semi-circular nose portion extending forward from the top edge, an arcuate bow-like edge extending downward from the nose portion, a rudder-like edge extending downward from the arcuate bow-like edge, and a substantially horizontal base edge extending from the rudder-like edge to the bottom of the trailing substantially vertical edge;

a pair of skis facing the front of the tow plate and attached to the top portion of the central plate;

a buoyant material secured to the upper surfaces of said pair of skis, said buoyant material able to render the tow plate floatable in water; and a pair of planar fins attached perpendicular to the bottom portion of the central plate.

2. The tow plate of claim 1, wherein the nose portion includes an aperture.

3. The tow plate of claim 1, wherein the central plate includes a multiplicity of apertures adjacent the trailing edge thereof to facilitate attachment of the tow plate to a floatable oil boom.

4. The tow plate of claim 1, further comprising means for adjusting the slope of the skis.

5. The tow plate of claim 4, further comprising means for adjusting the slope of the fins.

6. The tow plate of claim 1, wherein the buoyant material is a closed cell foam of a nitrile rubber-polyvinylchloride blend.

7. In combination, a floatable oil boom and a tow plate fixedly attached to the leading edge of the oil boom, said tow plate comprising a vertically planar central plate, a pair of skis facing the front of the tow plate and attached to the top portion of the central plate, a buoyant material secured to the upper surfaces of said pair of skis whereby the tow plate is floatable in water, and a pair of planar fins attached perpendicular to the bottom portion of the central plate.

8. The combination of claim 7 wherein the central plate includes:

a trailing, substantially vertical edge;

a substantially horizontal top edge extending forward from the top of the trailing, substantially vertical edge;

a substantially semi-circular nose portion extending forward from the top edge;

an arcuate bow-like edge extending downward from the nose portion;

a rudder-like edge extending downward from the arcuate bow-like edge; and a substantially horizontal base edge extending from the rudder-like edge to the bottom of the trailing, substantially vertical edge.

9. The combination of claim 8, wherein the central plate includes a multiplicity of apertures adjacent the trailing edge thereof to facilitate attachment of the tow plate to the oil boom.

* * * * *